United States Patent
Gillot

(10) Patent No.: US 10,316,995 B2
(45) Date of Patent: Jun. 11, 2019

(54) SEALED THREADED TUBULAR CONNECTION WHICH IS RESISTANT TO SUCCESSIVE PRESSURE LOADS

(75) Inventor: Laurent Gillot, Wargnies le Petit (FR)

(73) Assignees: VALLOUREC OIL AND GAS FRANCE, Aulnoye-Aymeries (FR); NIPPON STEEL & SUMITOMO METAL CORPORATION, Chiyoda-ku (JP)

( * ) Notice: Subject to any disclaimer, the term of this patent is extended or adjusted under 35 U.S.C. 154(b) by 518 days.

(21) Appl. No.: 12/811,018

(22) PCT Filed: Dec. 22, 2008

(86) PCT No.: PCT/EP2008/068134
§ 371 (c)(1),
(2), (4) Date: Jun. 28, 2010

(87) PCT Pub. No.: WO2009/083523
PCT Pub. Date: Jul. 9, 2009

(65) Prior Publication Data
US 2010/0283239 A1 Nov. 11, 2010

(30) Foreign Application Priority Data

Dec. 28, 2007 (FR) ...................................... 07 09159

(51) Int. Cl.
*F16L 15/00* (2006.01)
*E21B 17/08* (2006.01)

(52) U.S. Cl.
CPC ............ *F16L 15/004* (2013.01); *E21B 17/08* (2013.01)

(58) Field of Classification Search
CPC ....... F16L 15/00; F16L 15/004; F16L 15/009; F16L 15/04

(Continued)

(56) References Cited

U.S. PATENT DOCUMENTS 2,239,942 A * 4/1941 Stone et al. .................. 285/110
3,870,351 A * 3/1975 Matsuki ......................... 285/334

(Continued)

FOREIGN PATENT DOCUMENTS

DE    44 46 806 C1    5/1996
DE   198 36 088 C1    2/2000

(Continued)

*Primary Examiner* — Anna M Momper
*Assistant Examiner* — James A Linford
(74) *Attorney, Agent, or Firm* — Oblon, McClelland, Maier & Neustadt, L.L.P.

(57) ABSTRACT

A sealed threaded tubular connection resistant to successive pressure loads includes a male element including a male threading and a female element including a female threading corresponding to the male threading. At least one of the elements includes a lip extending beyond the threading to the free end of the element and the other element includes a recess for the lip. The lip includes a first zone with a peripheral surface turned towards the other element on which a first sealing surface is disposed that can be radially interference fitted against a corresponding second sealing surface disposed on the peripheral surface of the recess of the other element. The lip includes a second axially located zone between the first zone and the free end of the element that includes a first radial bearing surface turned towards the other element in contact with a corresponding second radial bearing surface disposed on the peripheral surface of the recess of the other element. The first and second zones are axially separated by a third zone with a radial stiffness lower than the first and second zones, the third zone capable of being radially deformed towards the other element by a pressure exerted thereon.

15 Claims, 2 Drawing Sheets

(58) Field of Classification Search
USPC .............. 285/110, 333, 334, 334.4, 355
See application file for complete search history.

(56) References Cited

U.S. PATENT DOCUMENTS

| | | | |
|---|---|---|---|
| 4,647,085 A * | 3/1987 | Anderson .............. | F16L 15/04 |
| | | | 285/302 |
| 4,648,627 A * | 3/1987 | Reimert .................. | 285/24 |
| 4,770,444 A | 9/1988 | Hauk | |
| 4,946,201 A * | 8/1990 | Tai ........................ | 285/94 |
| 5,064,224 A * | 11/1991 | Tai ........................ | 285/94 |
| 6,056,324 A * | 5/2000 | Reimert .............. | E21B 17/042 |
| | | | 285/18 |
| 6,511,102 B2 | 1/2003 | Krug et al. | |
| 6,752,436 B1 | 6/2004 | Verdillon | |
| 7,334,821 B2 | 2/2008 | Dutilleul et al. | |
| 2007/0187951 A1 | 8/2007 | Roussie et al. | |
| 2010/0270793 A1 * | 10/2010 | Takano et al. .......... | 285/333 |

FOREIGN PATENT DOCUMENTS

| | | |
|---|---|---|
| EP | 0 229 861 | 7/1987 |
| EP | 1 631 762 B1 | 8/2010 |
| FR | 2 868 146 | 9/2005 |

\* cited by examiner

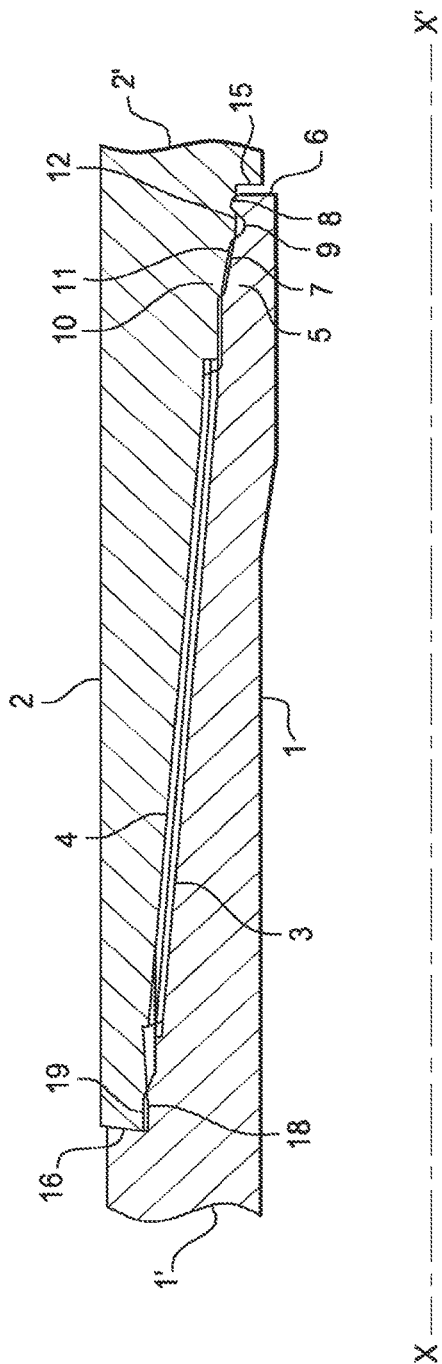
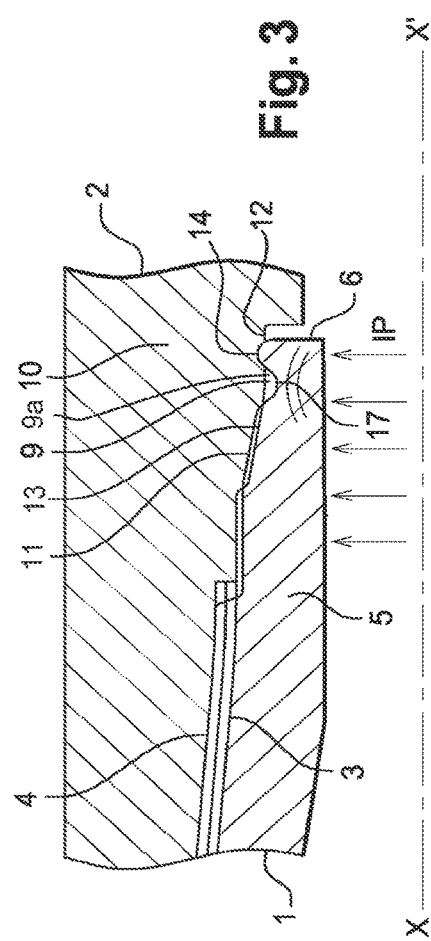

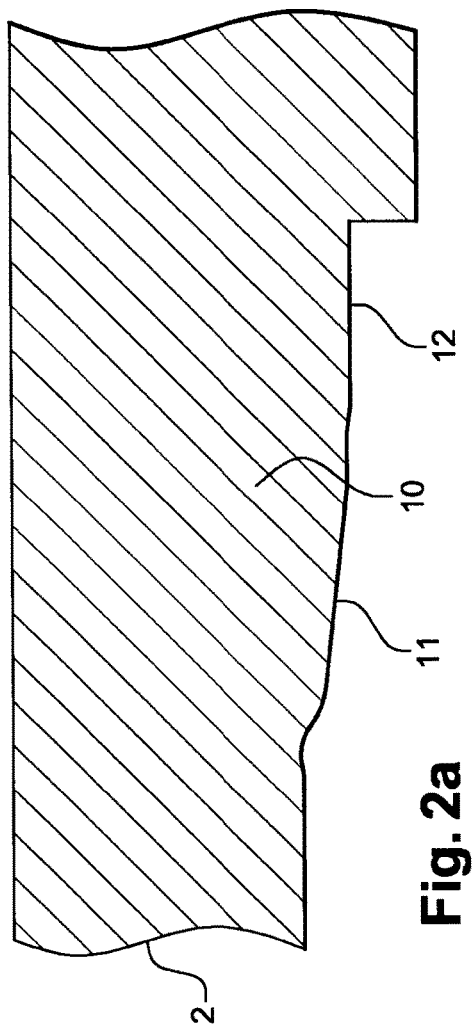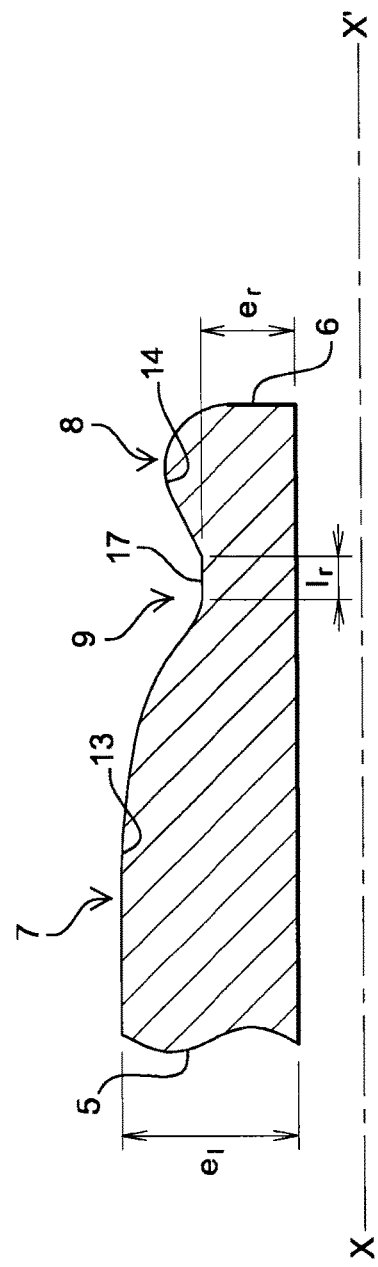
Fig. 2a
Fig. 2b

SEALED THREADED TUBULAR CONNECTION WHICH IS RESISTANT TO SUCCESSIVE PRESSURE LOADS

The present invention relates to a sealed threaded tubular connection which is resistant to static loads such as axial tension, axial compression, planar bending, internal or external pressure and a combination thereof.

Such threaded tubular connections, which will hereinafter be termed connections, can be produced by connecting a male element at the end of a first tubular component which may, for example, be a great length tube, and a female element at the end of a second tubular component which may, for example, be a great length tube or a coupling, each of its elements being provided with a metal sealing surface and being radially interference fitted against the metal sealing surface of the other element.

Such connections are used to produce sealed casing or tubing strings for hydrocarbon wells or for similar wells such as geothermal wells, for example.

More particularly, the invention concerns connections known as premium connections which comprise metal sealing surfaces which radially interfere and are associated with internal, external or central abutment surfaces which are intended to precisely position said sealing surfaces.

Such sealing surfaces are zones which are extremely critical which provide the connection with a seal against high pressures of fluids, including gases.

In hydrocarbon wells, such connections are subjected to various loads such as tension, compression, bending along the axis of the tubes, or pressure. Those various loads may vary with time, for example when cementing casing strings (increase in exterior pressure) or during the production step (increase in internal pressure) or even during maintenance operations (stopping then recommencing production) and may act alone or in combination.

Such connections are expected not only to tolerate such mechanical loads, but also to remain tight when such loads are applied and in particular when an internal pressure is applied when such connections have, for example, just one external abutment and/or central abutment but no internal abutment.

The term "internal abutment" means an abutment located close to the internal surface of the tubular components and thus located close to the free end of the male element.

For this reason, it has been sought to improve such connections, especially those which do not have an internal abutment, in order to increase their sealing characteristics as regards internal pressure by optimizing in particular the function of the sealing surface located close to the threading.

The prior art as regards such connections comprising or not comprising an internal abutment proposes means for improving the seal of metal sealing surfaces which are subjected to loads such as internal pressure. These means have in particular been described in German patent DE 4446806 and International patent application WO 00/08367.

FIG. 3 of DE 4446806 discloses a connection provided with an internal abutment (10) comprising a female element (1) and a male element (7) the free end of which comprises a metal-metal sealing system composed of a pair of principal contact surfaces (4) close to the threading and a pair of secondary contact surfaces (8) close to the internal abutment (10) separated by a transitional surface (11). The shape of the secondary contact surfaces (8) is tapered regardless of the element on which they are located; that of the principal contact surfaces (4) is domed for the surface located on the male element (7) and tapered for the surface located on the female element (1). To optimize the seal of the connection to internal pressure, the external peripheral surface of the zone (12) of the male element adjacent to the internal abutment (10) is machined to reduce the thickness of the lip at that level and thereby provide the free end of the male element (7) with better elasticity and thus a better contact pressure at the secondary contact surfaces (8) when internal pressure is applied. The secondary contact surface (8) also ensures an optimal radial positioning of the principal contact surface (4) over the whole of its periphery in the case of irregularities of the tubular component such as machining defects or ovality defects.

FIG. 7 of WO00/08367 describes a connection with no internal abutment wherein the male element (30) comprises, at its free end, a lip comprising two zones which are suited to come into contact with a corresponding housing disposed on the female element (40). The first contact zone, disposed on the threading side, has a tapered sealing surface (32) on its external peripheral surface. The second contact zone, close to the first, is disposed at a short distance from the free end of the male element (36) and has a tapered surface (33) the taper of which is greater than that of the sealing surface (32) by at least 20%. At the first contact zone (32), the geometric interference between the male element (30) and the female element (40) is weaker than that at the second contact zone (36). The position of the contact zones thus enables to optimize the transverse forces and the bending moment to which the connection is subjected at the second contact zone (36) and thereby protect the sealing surface (32) from any plastification to prevent the connection from leaking. As in DE 4446806, this second contact zone (36) also provides an optimum radial positioning of the sealing surface over the whole of its periphery in the case of irregularities in the tubular component such as machining defects or ovality defects.

Another way of optimizing the sealing characteristics of such connections which are subjected to successive internal pressure loads by increasing the interference contact pressure between the sealing surfaces of the male and female elements has also been sought.

We have also sought a connection which performs well under all of the various load modes.

We have also endeavoured to ensure that the invention is of particular application to connections comprising an internal seal and in particular connections with a constant external diameter (flush) and connections with an external diameter which differs slightly between the male and female elements (semi-flush).

In accordance with the invention, the connection comprises a male element disposed at the end of a first tubular component and including a male threading and a female element disposed at the end of a second tubular component and including a female threading corresponding to the male threading.

At least one of the elements comprises a lip extending beyond the threading to the free end of the element. The other element comprises a recess for the lip.

The lip comprises a first zone with a peripheral surface turned towards the other element on which is disposed a first sealing surface which is suited to be radially interference fitted against a corresponding second sealing surface disposed on the peripheral surface of the recess of the other element.

The lip has a second zone located axially between said first zone and the free end of the element. This second zone is a zone which bears radially against a corresponding portion of the other element and comprises a first radial bearing surface turned towards the other element in contact with a second bearing radial surface on the peripheral surface of said recess of the other element.

In accordance with a principal characteristic of the invention, said first and second zones are separated axially by a third zone with a lower radial stiffness than said first and second zones and which can be radially deformed towards the other element by a pressure which is exerted thereon.

Advantageously, the thickness of said third zone is less than the thickness of the first zone and the thickness of the second zone.

Advantageously again, the minimum thickness of said third zone is in the range 60% to 80% of the thickness of said lip.

Advantageously, the minimum thickness of said third zone is 70% of the thickness of said lip.

Preferably, the axial length of said third zone where the thickness is a minimum is in the range 0.25 to 5 mm.

Preferably, said axial length is 0.5 mm.

Preferably, said second zone is located at the free end of the element.

Preferably, the first radial bearing surface is a portion of a toric surface.

Preferably, the radius of said toric surface portion is 5 mm or less.

Advantageously, the second radial bearing surface is a portion with a cylindrical surface.

Preferably, the first and second radial bearing surfaces have a geometric interference which is 5% to 20% greater than that between the first and second sealing surfaces.

Preferably, said first and second sealing surfaces are tapered surface portions with a substantially equal taper.

Advantageously, said tapered surface portions have a taper in the range 5% to 50%.

Preferably, there is a space between a front surface of the free end of the lip and the other element.

Preferably, said lip is located on the male element.

In accordance with one embodiment of the invention, said third zone is defined by an annular groove on the external periphery of the lip.

Other advantages and characteristics of the invention will become apparent from the following detailed description and accompanying drawings which thus not only act to provide a better comprehension of the invention but also contribute to its definition, as necessary.

FIG. 1 shows a longitudinal half section of a flush connection in accordance with one embodiment of the invention. FIG. 1 highlights the geometrical interferences between the contacting surfaces.

FIG. 2 shows a longitudinal half section of a preferred embodiment of the male and female elements of the flush connection of FIG. 1 of the invention.

FIG. 3 shows a longitudinal half section of a flush connection of the invention which is subjected to internal pressure. FIG. 3 highlights the geometrical interferences between the surfaces in contact.

Figure 4:
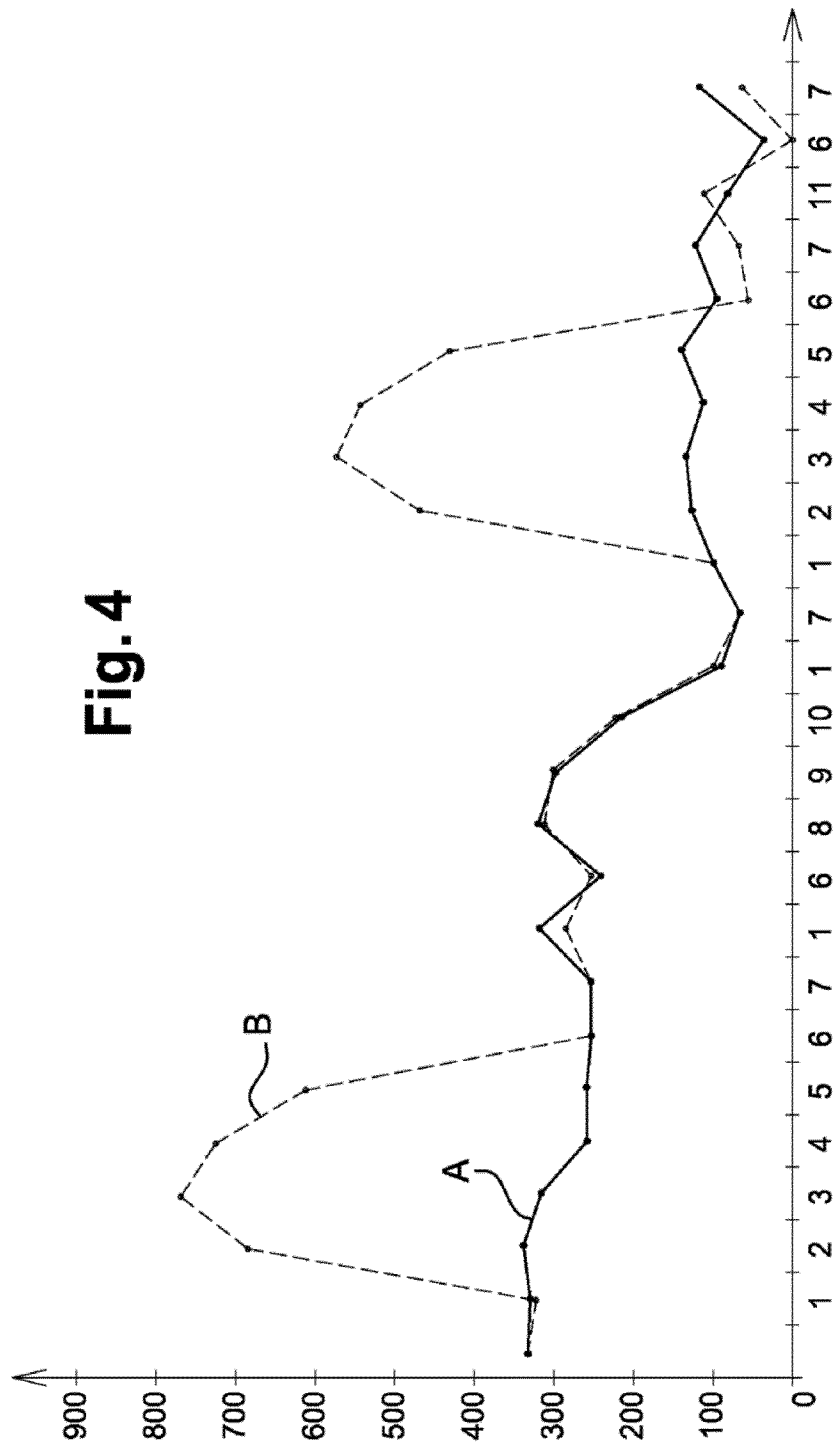
FIG. 4 is a graph showing relative contact pressure measurements obtained by finite element analysis for different types of flush connections subjected to various successive load modes.

FIG. 1 shows a preferred embodiment of a flush connection which comprises a male element 1 disposed at the end of a first tubular component 1' and a female element 2 disposed at the end of a second tubular component 2'. The axis of the connection is represented by the dashed lines XX'.

The male element 1 comprises a male threading 3 and a male lip 5 extending the male threading 3 to the free end 6 of the male element 1.

The male lip 5 comprises (see FIG. 2b):
a first zone 7 located after the threading 3 with an external peripheral surface on which a first sealing surface 13 is located;
a second zone 8 located at the end of the male element 1 having an external peripheral surface turned towards the female element 2 on which is located a first radial bearing surface 14 which can come into contact with a corresponding second radial bearing surface 12 disposed on the female element 2;
a third zone 9 located axially between the first zone 7 and the second zone 8 with a radial stiffness which is lower than the first and second zone 7, 8.

The female element 2 comprises a female threading 4 which corresponds to the male threading 3 then a non threaded portion forming a recess 10 to correspond with and cooperate with the lip 5 of the male element 1.

The female recess 10 has an inwardly turned peripheral surface on which a second sealing surface 11 is formed which is suited to be radially interference fitted against the corresponding first sealing surface 13 of the male element 1 and a second radial bearing surface 12 which can come into contact with the first radial bearing surface 14 of the lip 5: see FIG. 2a.

This peripheral surface is connected on one side to the female threading 4 and on the other side via a female shoulder 15 to the cylindrical internal peripheral surface of the body or regular portion of the second tubular component 2'.

A space is left free between the shoulder 15 of the female element 12 and the front surface of the free end 6 of the male element 1.

The free end of the female element 2 constitutes a substantially transversely disposed annular axial abutment surface 16. This external abutment 16 allows the external 18, 19 and internal 13, 11 sealing surfaces to be positioned axially with respect to each other and to thereby define their radial interference fit.

FIG. 1 shows the geometrical interference between the internal 13, 11 and external 18, 19 sealing surfaces and between the radial bearing surfaces 14, 12. The term "geometric interference" means a difference in diameter between corresponding surfaces of the male 1 and female 2 elements on a drawing of the elements of the connection or measured on each element before makeup.

FIG. 2 shows a preferred embodiment of the invention for the male lip 5 (FIG. 2b) and the female recess 10 (FIG. 2a). The axis of the connection is shown by the dashes XX'.

The male lip 5 shown in FIG. 2b has an external peripheral surface and an internal peripheral surface which corresponds to the end zone of the internal peripheral surface of the first tubular component 1'. The male lip 5 thus has a thickness $e_1$ which, measured just after the threading, is substantially equal to 30% of the thickness $e_t$ of the tubular component 1', for example.

The internal peripheral surface of the male lip 5 comprises, starting from the threading 3 and moving towards the free end 6 of the male element 1, a first zone 7 on which a first sealing surface 13 is located which can be radially interference fitted against a corresponding second sealing surface 11 disposed on the female element 2 shown in FIG. 2a.

These first and second sealing surfaces 13, 11 are, for example, portions of a tapered surface which in this case have a taper of 10%.

A taper of less than 5% is more likely to cause problems with galling and a taper of more than 50% risks requiring lips which are too thick.

The internal peripheral surface of the male lip 5 comprises, at the free end 6 of the male element 1, a second zone 8 on which a first radial bearing surface 14 is located which is suited to come into contact with a second radial bearing surface 12 disposed on the corresponding recess 10 of the female element 2 shown in FIG. 2a.

The first and second radial bearing surfaces 14, 12 preferably have a geometric interference which is higher than that of the first and second sealing surfaces 13, 11 by about 5% to 20%, preferably 5% to 15%.

An interference between radial bearing surfaces 14, 12 which is less than or equal to that between the sealing surfaces 13, 11 cannot ensure radial bearing of the second zone 8 of the lip 5 against the female element 2 after makeup. Too much interference risks degrading the sealing characteristics of the sealing surfaces 13, 11.

If a constant contact pressure between the radial bearing surfaces is to be conserved despite axial variations linked to tensile and compressive loads to which the male 1 and female 2 elements are subjected, the first radial bearing surface 14 may be a toric surface portion the radius of which is substantially less than or equal to 5 mm and the corresponding second radial bearing surface 12 disposed on the female element 2 may be a portion with a cylindrical surface.

The internal peripheral surface of the male lip 5 comprises, between the first zone 7 and the second zone 8, a third zone 9 with a lower radial stiffness than the first and second zone 7, 8.

This third zone 9 is defined here by an annular groove 9a on the external peripheral surface of the lip 5.

The peripheral surface of the groove 9a comprises, for example, a cylindrical surface 17 connected to the first sealing surface 13 via a portion with a tapered surface and to the first radial bearing surface 14 via a portion with a toric surface. The cylindrical surface 17 constitutes a minimum thickness portion of the third zone 9.

The axial length $l_r$ of the minimum thickness portion of the third zone 9 is in this case equal to 0.5 mm. This axial length $l_r$ is measured between the portion with a tapered surface connected to the first sealing surface 13 and the portion with a toric surface connected to the first radial bearing surface 14. An axial length $l_r$ of less than 0.25 mm results in insufficient radial stiffness and an axial length $l_r$ of more than 5 mm causes too much bulk.

The thickness $e_r$ of the third zone 9, measured between the cylindrical surface 17 and the external peripheral surface of the male lip 5, is less than the thickness of the male lip $e_r$ measured just after the threading 3.

The thickness $e_r$ is in the range 60% to 80% of the thickness $e_l$ of the male lip 5. Preferably, thickness $e_r$ is 70% of thickness $e_l$ of the male lip 5.

This reduction in thickness causes a reduction in the radial stiffness of the third zone 9 and thus allows radial deformation thereof towards the female element 2 when internal pressure (IP) is exerted thereon. A thickness of less than 60% or more than 80% of the thickness $e_l$ of the male lip 5 is less susceptible of ensuring contact between the first and second radial bearing surface 14, 12 at the time of the second internal pressure cycle (IP) applied during qualification tests enabling to define the sealing performance of the connection.

These qualification tests are in particular defined in International Standard ISO 13679 (test procedures for connections for casing and tubing strings) wherein cycles of various combinations of loads to which the connection may be subjected during use in a well are applied to test that the seal of the connection is good.

The notion of "radial stiffness" in this case includes characteristics inherent to the material and dimensional characteristics.

FIG. 3 describes a connection according to the invention in the made up state comprising a male element 1 and a female element 2 to which an internal pressure (IP) is applied. The male element 1 comprises, after the threading 3 and towards the free end 6, a male lip 5 the external peripheral surface of which comprises a first sealing surface 13, a first radial bearing surface 14 and an annular groove 9a with a cylindrical peripheral surface 17 located between the first sealing surface 13 and the first radial bearing surface 14. The female element 2 comprises a recess 10 corresponding to the male lip 5 on which a second sealing surface 11 and a second radial bearing surface 12 are located. The geometry of these various surfaces 13, 14, 11, 12 and 17 is as described in FIGS. 2a and 2b. In the made up state, the front surface of the free end 6 of the male element 1 does not come into contact with the female element 2 and so there is a space left free between the two elements.

Application of internal pressure (IP) to the connection produces a radial deformation of the third zone 9, schematically shown in FIG. 3 by curved lines.

This radial deformation generates, at the contact zone of the first and second sealing surfaces (13, 11) and the bearing zone of the first and second radial bearing surfaces 14, 12, an excess of elastic interference contact energy which will allow the contact pressure to increase, in particular at the contact zone of the first and second sealing surfaces 13, 11.

Excess energy is also generated at the first and second radial bearing surfaces 14, 12, but the contact pressure between these first and second radial bearing surfaces 14, 12 is lower than that between the first and second sealing surfaces 13, 11 due to the position of the radial bearing surfaces 14, 12 at the end and the relative geometric interference between the sealing surfaces 13, 11 and the radial bearing surfaces 14, 12.

The role of the first and second radial bearing surfaces 14, 12 is to ensure not only a second point of contact between the male element 1 and the female element 2 to enable to increase the contact pressure between the first and second sealing surfaces 13, 11 when internal pressure (IP) is applied, but also in the present case to maintain a constant interference fit between the first and second radial bearing surfaces 14, 12 regardless of the axial displacements between the male element 1 and the female element 2 caused by the tensile and/or compressive loads to which the connection is subjected during service.

The graph of FIG. 4 allows the contact area, hereinafter termed the contact pressure integral, to be compared between the first and second sealing surfaces of several connections undergoing a load cycle. The abscissa represents the various loads applied and the ordinate represents the contact pressure integral obtained along the contact of the first and second sealing surfaces (contact area). This contact pressure integral is measured by finite element analysis. The values obtained are relative values expressed as a percentage and normalized with respect to reference first and second sealing surfaces, namely those of the connection of the invention without the second radial bearing surfaces and without the third zone.

Table 1 below defines the meanings of the reference signs on the abscissa of the graph of FIG. 4.

TABLE 1

Meaning of reference signs on FIG. 4

| Reference signs on abscissa | Load(s) applied |
| --- | --- |
| 1 | Tension |
| 2 | Tension + internal pressure |
| 3 | Capped end pressure |
| 4 | Internal pressure |
| 5 | Compression + internal pressure |
| 6 | Compression |
| 7 | None |
| 8 | Compression + exterior pressure |
| 9 | Exterior pressure |
| 10 | Tension + exterior pressure |

The contact pressure integrals for the following connections were then simulated:

Example A: reference connection with no radial bearing surface;

Example B: connection in accordance with embodiment of the invention of FIG. 1.

Compared with the reference connection (example A), it can be seen that the sealing performances of the connection of FIG. 1 (Example B) are substantially better when internal pressure is applied.

The advantageous effect of the first and second radial bearing surfaces (14, 12) and of the third zone 9 with which the connection of FIG. 1 of the invention is provided has thus been demonstrated.

One advantage of the present invention is the production at the male lip 5 of a zone which is deformable under the effect of internal pressure (IP) wherein the energy obtained by deformation is used to generate a supplemental contact pressure at the first and second sealing surfaces 13, 11.

Another advantage of the embodiment of the present invention shown in FIG. 2 is that the internal pressure (IP) can be blocked or at least limited by the first and second radial bearing surfaces 14, 12. As a result, the first and second sealing surfaces 13, 11 are preserved from any damage.

However, it will be noted that it is not necessary for the first and second radial bearing surfaces to be surfaces which are in perfectly tight contact after makeup.

A further advantage of the preferred embodiment of the present invention shown in FIG. 2 is that the geometry of the radial bearing surfaces 14, 12 enables to maintain a constant interference fit despite axial movements in the male 1 and female 2 elements generated by tensile and/or compressive loads to which the connection is subjected in service.

Although not described, the annular groove 9 may be located on the internal surface of the lip.

The first and second sealing surfaces 13, 11 may be toric on one element and tapered on the other element, or both toric surfaces, or a combination of toric and tapered surface on one element and a tapered surface on the other element, as disclosed in French patent FR2 833 335.

The invention, of course, is applicable to first, second and third zones disposed on one lip of the female element.

Thus, the invention can be applied to types of connections other than flush type connections, such as connections which are known as "semi-flush" connections (where the external diameter of the female element is only very slightly larger than that of the male element), connections with a central abutment or without an abutment, or coupled connections.

The invention claimed is:

1. A sealed threaded tubular connection comprising:

a male element disposed at an end of a first tubular component including a male threading and a female element disposed at an end of a second tubular component including a female threading corresponding to the male threading, at least one of the elements comprising a lip extending beyond the threading to a free end of one of the male or the female element and the other one of the male or the female element comprising a recess for the lip, the lip comprising a first zone with a peripheral surface turned towards the other element on which a first metal sealing surface is disposed configured to be radially interference fitted against a corresponding second metal sealing surface disposed on a peripheral surface of the recess of the other element, the lip comprising a second axially located zone between the first zone and the free end of the element comprising a first radial bearing surface turned towards the other element and in contact with a corresponding second radial bearing surface disposed on the peripheral surface of the recess of the other element, wherein the first and second zones are separated axially by a third zone with a radial stiffness which is less than the first and second zones and capable of being radially deformed towards the other element by a pressure exerted thereon, wherein a thickness of the third zone is less than a thickness of the first zone and a thickness of the second zone, wherein the third zone is defined by an annular groove on an external periphery of the lip, wherein a peripheral surface of the annular groove comprises a cylindrical surface that constitutes a minimum thickness portion of the third zone, wherein a free end of the female element constitutes a transversely disposed external annular axial abutment surface, the external annular axial abutment surface allows the first metal sealing surface to be positioned axially with respect to the second metal sealing surface to thereby define a respective radial interference fit between the first metal sealing surface and the second metal sealing surface, and allows a first external metal sealing surface to be positioned axially with respect to a second external metal sealing surface to thereby define a respective radial interference fit between the first external metal sealing surface and the second external metal sealing surface, and wherein the first external metal sealing surface is provided with the male element, and the second external metal sealing surface is provided with the female element, the first and the second external metal sealing surfaces being positioned between the threading and the external annular axial abutment surface.

2. A threaded tubular connection according to claim 1, wherein the minimum thickness of the third zone is in a range 60% to 80% of a thickness of the lip.

3. A threaded tubular connection according to claim 1, wherein the minimum thickness of the third zone is 70% of a thickness of the lip.

4. A threaded tubular connection according to claim 1, wherein an axial length of the third zone where the thickness is a minimum, is in a range 0.25 to 5 mm.

5. A threaded tubular connection according to claim 4, wherein the axial length of the third zone where the thickness is a minimum is 0.5 mm.

6. A threaded tubular connection according to claim 1, wherein the second zone is located at the free end of the element.

7. A threaded tubular connection according to claim 1, wherein the first radial bearing surface comprises a portion with a toric surface on its peripheral surface turned towards the other element.

8. A threaded tubular connection according to claim 7, wherein a radius of the toric surface portion is 5 mm or less.

9. A threaded tubular connection according to claim 1, wherein the first radial bearing surface is a portion with a cylindrical surface.

10. A threaded tubular connection according to claim 1, wherein the first and second radial bearing surfaces have a geometric interference which is 5% to 20% greater than that between the first and second sealing surfaces.

11. A threaded tubular connection according to claim 1, wherein the first and second sealing surfaces are tapered surface portions with an equal taper.

12. A threaded tubular connection according to claim 11, wherein the tapered surface portions have a taper in the range 5% to 50%.

13. A threaded tubular connection according to claim 1, wherein there is a space between a front surface of the free end of the lip and the other element.

14. A threaded tubular connection according to claim 1, wherein the lip is located on the male element.

15. A threaded tubular connection according to claim 1, wherein the first radial bearing surface comprises a toric surface facing in a direction of the second radial bearing surface, and the second radial bearing surface includes a cylindrical surface configured to contact the tonic surface.

* * * * *

UNITED STATES PATENT AND TRADEMARK OFFICE
CERTIFICATE OF CORRECTION

PATENT NO. : 10,316,995 B2  
APPLICATION NO. : 12/811018  
DATED : June 11, 2019  
INVENTOR(S) : Laurent Gillot Page 1 of 2

It is certified that error appears in the above-identified patent and that said Letters Patent is hereby corrected as shown below:

On the Title Page

Under abstract "15 Claims, 2 Drawing Sheets" should read --15 Claims, 3 Drawing Sheets--;

In the Drawings

Please add FIG. 4 as shown on the attached page;

In the Specification

Column 5, Line 43, change "with a tonic" to --with a toric--;

Column 5, Line 56, change "the male lip $e_r$." to --the male lip $e_l$--; and

In the Claims

Column 10, Line 17, change "the tonic surface" to --the toric surface--.

Signed and Sealed this  
Seventeenth Day of November, 2020

Andrei Iancu  
*Director of the United States Patent and Trademark Office*